United States Patent
Lee et al.

(10) Patent No.: US 7,167,899 B2
(45) Date of Patent: Jan. 23, 2007

(54) WEB-CONTENT AWARE AUTOMATIC CALL TRANSFER SYSTEM AND PROCESS FOR MOBILE USERS AND OPERATORS

(75) Inventors: Kuo Chu Lee, Princeton Jct., NJ (US); Tao Lin, Lawrenceville, NJ (US); Juan Yu, Cranbury, NJ (US)

(73) Assignee: Matsushita Electric Industrial Co., Ltd., Osaka (JP)

( * ) Notice: Subject to any disclaimer, the term of this patent is extended or adjusted under 35 U.S.C. 154(b) by 681 days.

(21) Appl. No.: 10/106,639

(22) Filed: Mar. 26, 2002

(65) Prior Publication Data
US 2003/0187988 A1    Oct. 2, 2003

(51) Int. Cl.
G06F 15/16   (2006.01)
H04M 3/42    (2006.01)
H04Q 7/20    (2006.01)

(52) U.S. Cl. .............. 709/204; 709/206; 709/227; 379/209.01; 379/210.01; 379/211.01; 455/416; 455/458

(58) Field of Classification Search .......... 379/265.02, 379/265.09, 220; 709/205
See application file for complete search history.

(56) References Cited

U.S. PATENT DOCUMENTS

| 5,987,116 | A  | * | 11/1999 | Petrunka et al. | ....... | 379/265.13 |
| 6,295,551 | B1 | * | 9/2001  | Roberts et al.  | ......... | 709/205 |
| 6,445,784 | B1 | * | 9/2002  | Uppaluru et al. | ...... | 379/220.01 |
| 6,778,661 | B1 | * | 8/2004  | Yumoto et al.   | ........ | 379/265.09 |
| 6,826,194 | B1 | * | 11/2004 | Vered et al.    | ............. | 370/449 |
| 6,850,614 | B1 | * | 2/2005  | Collins         | .............. | 379/265.09 |

OTHER PUBLICATIONS

Popovic, M and Kovacevic, V, "Software Reliability & Maintenance Concept used for Automatic Call Distributor Medio ACD," Oct. 2000, IEEE, pp. 336-342.*
Willner, R, Lee, L. W., "IN Service Creation Elements: Variations on the Meaning of a SIB," May 1997, IEEE, vol. 1, pp. 1-16.*
Bernett, Howard and Jaramillo, Melissa L. "Assessing Web-Enabled Call Center Technologies," May-Jun. 2001, IEEE, vol. 3, Issue 3, pp. 24-30.*

* cited by examiner

Primary Examiner—Jason Cardone
Assistant Examiner—Azizul Choudhury
(74) Attorney, Agent, or Firm—Harness, Dickey & Pierce, PLC

(57) ABSTRACT

The Web customer contact system is based on distributed execution of service logic programs that can be dynamically altered based on changing business needs. The distributed and dynamic program modification makes the Web customer contact system scalable and customization to the most demanding business operation needs. For example, existing workflow based GUI programming tool, which only support centralized specification, down load and execution of routing rules for incoming calls in a contact center. The new system WCC system can allow user to specify a set of service logic program (SLP) can be dynamically attached to any distributed "addressable entities" in the WCC system. The addressable entities can be a user, an agent, an email box, a work group, IVR system, or a department web site. The addressable entities can be located anywhere that can be reached by internet address (an URL or other types of identities). The SLP associated with the addressable entities can be dynamically downloaded from the "home" location of the SLP. The SLP allows a business to define the way of handling customer's messages such as call, chat and email in a flexible and programmable way using an open specification interface such as, XML technology.

35 Claims, 11 Drawing Sheets

WEB-CONTENT AWARE AUTOMATIC CALL TRANSFER SYSTEM AND PROCESS FOR MOBILE USERS AND OPERATORS

BACKGROUND AND SUMMARY OF THE INVENTION

The present invention relates generally to telephone call routing systems and internet server systems. More particularly, the invention relates to a system and method that digitally associates telephony and internet content, allowing calls to be routed among selected calling and receiving parties, enabling the parties to communicate over the telephone network while simultaneously accessing concurrent internet content.

Anyone who has interacted with a complex automated telephone attendant system, voicemail system, or automated help desk system knows well the shortcomings of current technology. The user may be prompted for certain information that is used to route the user's call to the proper telephone extension or help desk agent. For example, a user may be prompted to input his or her account number into an automated banking system, in order to verify that the user has an account and to then route the user's call to the proper department. Unfortunately, current systems do not have a mechanism to retain the user-entered data (e.g., account number) after the call is transferred. Thus the officer or help desk agent receiving the routed call must again ask the user to repeat the previously entered information. Depending on the complexity of the sequence of routing operations, the user may be asked to enter his or her account number several times during the process.

Now that the internet is readily available to most people, many elect to bypass the conventional telephone-based help desk system by seeking assistance via web-based internet sources. Recognizing that many users will visit a company web site first, before placing a telephone call to receive personal assistance, many companies have constructed their web sites to provide answers to the most commonly sought questions. Banking systems, for example, allow the user to enter his or her account number along with a password and then view the current state of the user's account. While internet-based resources do eliminate some of the problems associated with telephone-based, voice-prompted systems, there are still times when a user simply needs to talk to a real person.

Currently, after the user has researched his or her question through the information available on the company's web site, the user may desire to call a help desk or customer service department to obtain further information from a human agent. Because there is no link between web page and telephone call, the agent has no way of knowing what information the user has already obtained via the internet, nor does the agent know what information the user has provided via the internet when answering the user's call. Thus the agent must ask the caller to repeat pertinent information, including what web page the user is viewing or has viewed, in order to handle the user's request. If the agent needs to refer the caller to another agent or another department, chances are good that the caller will need to repeat the same information again, as conventional systems do not capture and forward the state of the transaction carried out thus far.

The present invention addresses these problems through a system that associates internet content data and telephony data so that information provided by a user through a web site will automatically be associated with the user's telephone call. Even if the call is routed to a succession of different agents, all information previously gathered through the internet or through a telephone-based interactive response system will be maintained. The system is quite flexible. It even allows the help desk agent or attendant to provide internet information back to the caller. Thus the agent can cause the user's browser to display a different web page or different media content without requiring the user to take any overt action. If the appropriate agent is not available to handle a user's call when the user first requests it, the system has a callback scheduling module that will initiate a telephone call to the user when an agent is available and the system will automatically place both user and agents' internet web screens in synchronism when the user answers the call. In this way the user and the agent can efficiently conduct business without the need to repeat information that was previously supplied.

Although the system is well-suited for centralized helpdesk environments, there is no restriction that all agents must be physically located in a given premises. Indeed, the agent can physically reside anywhere he or she has access to a telephone network and suitable internet connection. Moreover, while the presently preferred embodiment is designed to support voiced communication over a conventional telephone network, the invention can readily be extended to voiced communication and video conferencing information over a computer network using IP packets or the like.

The present invention provides a novel Web customer contact system based on distributed execution of service logic programs that can be dynamically altered based on changing business needs. The distributed and dynamic program modification makes the Web customer contact system scalable and customization to the most demanding business operation needs. For example, existing workflow based GUI programming tool, which only support centralized specification, down load and execution of routing rules for incoming calls in a contact center. The new system WCC system can allow user to specify a set of service logic program (SLP) can be dynamically attached to any distributed "addressable entities" in the WCC system. The addressable entities can be a user, an agent, an email box, a work group, IVR system, or a department web site. The addressable entities can be located anywhere that can be reached by internet address (an URL or other types of identities). The SLP associated with the addressable entities can be dynamically downloaded from the "home" location of the SLP. The SLP allows a business to define the way of handling customer's messages such as call, chat and email in a flexible and programmable way using an open specification interface such as, XML technology.

According to another aspect of the invention, the web-content aware automatic call transfer system comprises an automated call dispatch server that is adapted for coupling to a computer network. The server has an associated telephony interface that is adapted for coupling to a telephone network. This telephone network could be a conventional circuit-switched network or a packet-switched computer network. The automated call dispatch server has an associated call model data structure that represents communications between parties as call objects. The call objects are capable of associating both internet content data and telephony data. The automated call dispatch server has an associated routing manager that is adapted for routing calls between a first party and a second party, using the call objects. In this way, the server enables the first and second parties to communicate over the telephone network while simultaneously accessing concurrent internet content.

For a more complete understanding of the invention, its objects and advantages, refer to the following specification and to the accompanying drawings.

BRIEF DESCRIPTION OF THE DRAWINGS

FIG. 8 is a sequence diagram illustrating message flow inside the automated call dispatching server when a new call comes in.

DETAILED DESCRIPTION OF THE PREFERRED EMBODIMENTS

Overview of Exemplary System

Before presenting a detailed description of the automatic call transfer system an overview will be presented to illustrate how the system may be used in a commercial application. The system is based on an automated call dispatch (ACD) architecture that supports a set of distributed service logic programs (SLPs) in accordance with the present invention. A more complete description of a presently preferred ACD architecture and of the SLP technology is provided below, following the present basic discussion of the automatic call transfer system featured in FIG. 1.

Figure 1:
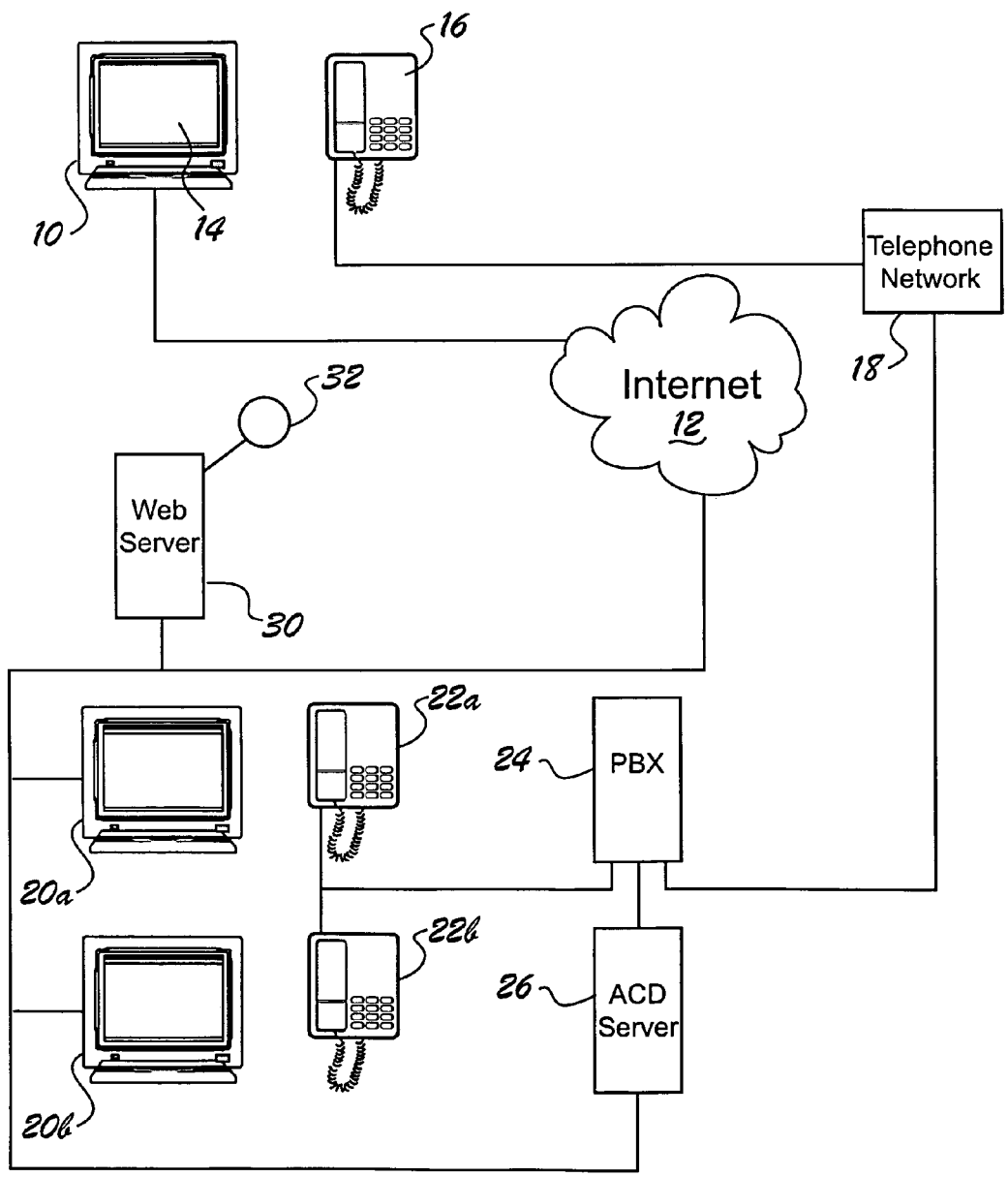
FIG. 1 is a system block diagram illustrating one implementation of the invention.

FIG. 1 illustrates an exemplary application in which both internet content data and telephony data are administered by the automated call dispatch (ACD) server. The illustrated embodiment shows how a typical help desk application or sales support application would be implemented using the invention. The end user has access to a computer 10 that is connected to a computer network such as the internet 12. Computer 10 includes suitable software such as a web browser so that internet content can be displayed in the web browser screen 14. The user also has a telephone 16 connected to suitable telephone network 18. Although a separate telephone 16 has been illustrated here, the invention can also be implemented using internet-based telephony. In such an embodiment the user would communicate by voice (and also optionally by video conferencing) using the computer 10. The user's voice is digitized and transmitted as packets over internet 12.

The help desk or sales support office may have one or more help desks or sales agents, each provided with computer equipment and telephones. FIG. 1 shows two agent work stations, which each include a computer terminal 20a and 20b and a telephone handset 22a and 22b. The telephone handsets are connected to a private branch exchange (PBX) telephone system 24. The PBX telephone system 24 is suitably connected to the telephone network 18, allowing it to place and receive calls over the telephone network.

The help center or sales support center also includes an automated call dispatch (ACD) server 26. The ACD server is connected to the computer terminals 20a and 20b and also to the PBX telephone system 24. Much of the functionality of the call transfer system resides in the ACD server. Details of the server are provided below.

For purposes of illustration it will be assumed that the help desk or sales support center is maintained by an enterprise that also has a public web site. Web server 30 is illustrated in FIG. 1 to provide this functionality. Web server 30 serves web pages and other internet content data to users' computer terminals, such as computer 10 via internet 12. As will be more fully explained, the web server 30 is provided with a small servlet 32 which allows the web server to interface with the ACD server 26. The servlet 32 is a small executable program installed on web server 30 to allow information passed to the web server 30 to be suitably forwarded on to the ACD server 26 for call transfer purposes. For example, if the user operating computer 10 inputs his or her telephone number to request a call back from an available sales agent, the information provided in response to a web page served by web server 30 is captured by the servlet 32 and forwarded to the ACD server 26. The ACD server 26 receives the user's telephone number from the servlet and then uses it to initiate a call back to the user when an available agent is free. In the presently preferred embodiment the servlet 32 is capable of supporting a wide variety of different features which require user-supplied information to be transferred to the ACD server. In this regard, the call back feature is but one example.

The Automated Call Dispatch (ACD) Architecture

Figure 2:
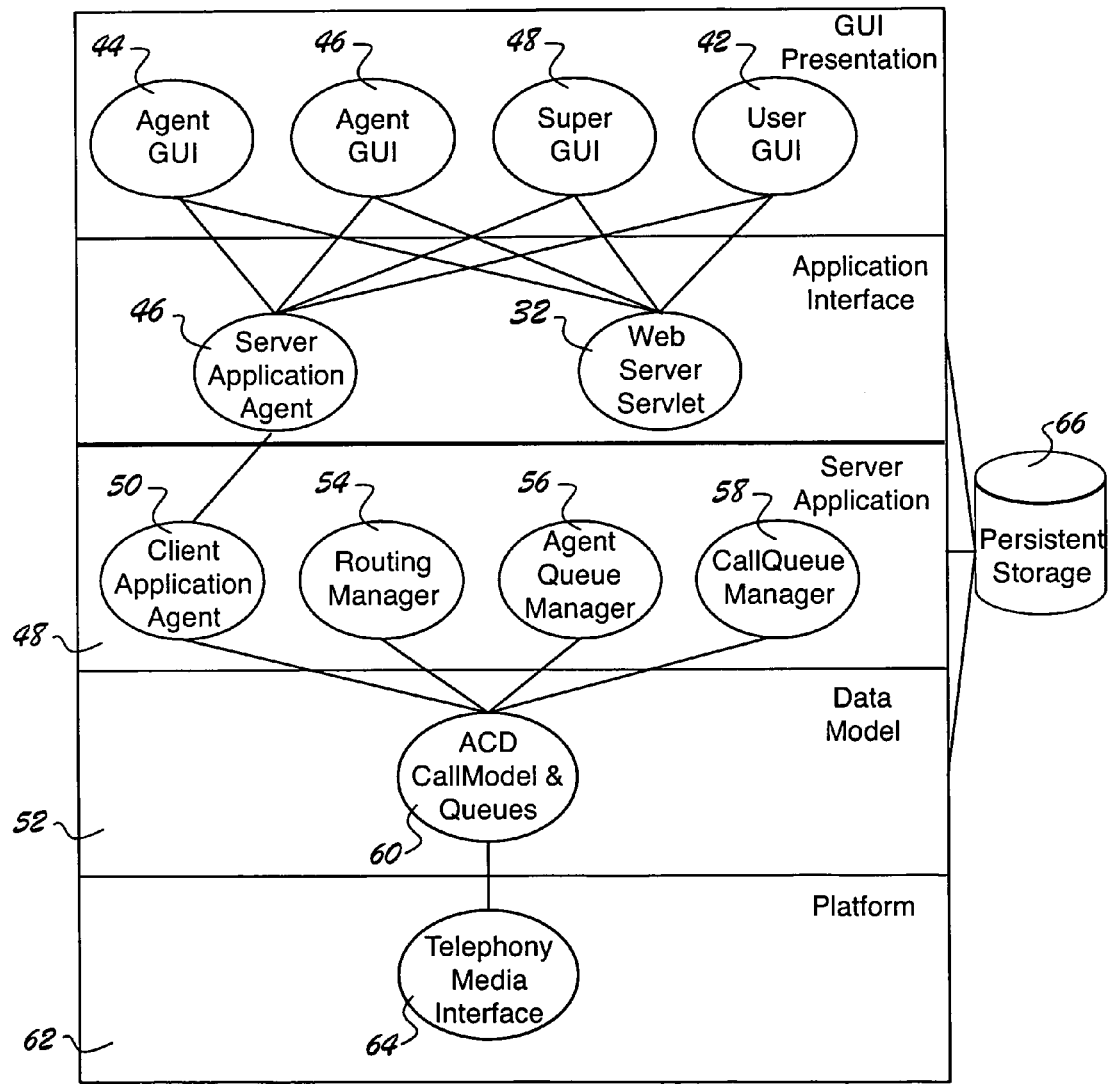
FIG. 2 is a block diagram illustrating the presently preferred architecture of the automated call dispatching system.

FIG. 2 shows the ACD architecture of a presently preferred embodiment. A layered architecture is used, in which each layer is represented as a rectangular box. The topmost layer is the graphical user interface presentation layer 40. This layer actually resides within the browser application software of the various parties that will use the system. The user graphical user interface (GUI) 42 dictates what an end user, such as the user of computer 10 in FIG. 1, will see in his or her browser window when accessing the web site hosted by web server 30 (FIG. 1). The agent GUI 44 controls what each help desk agent or sales support agent will see in his or her browser window when using the system. Thus agent GUI 44 controls what appears in the browser displays of computer terminals 20a and 20b. Other graphical user interfaces are possible. Illustrated in FIG. 2 is an administrator GUI 46 and a supervisor GUI 48. The administrator GUI 46 might be used, for example, to change settings in the system software associated with web server 30 and ACD server 26. The supervisor GUI 48 might be used, for example, by supervisors responsible for managing the help desk agents or sales support agents.

The next layer below the GUI presentation layer 40 is application interface layer 42. It is in this layer that the web server servlet 32 is preferably placed. As illustrated, the servlet 32 is capable of communicating with any of the graphical user interfaces found within the GUI presentation layer 40. Also found within application interface layer 42 is a server application agent 46. The server application agent performs the primary interface function of connecting all users (through their associated GUIs) to the server application layer 48. A corresponding client application agent 50, residing in the server application layer 48, provides the other end of the link. The preferred embodiments are based on multithreaded code in which each incoming or outgoing call is represented as a thread.

The server application layer 48 includes additional manager modules that provide different services for the underlying data model layer 52. These managers include a routing manager 54, an agent queue manager 56 and a call queue manager 58. The routing manager is responsible for all call routing operations. The details of this manager are provided below. The agent queue manager and the call queue manager are responsible for respectively handling the list of agents that are available to handle an incoming call and the list of incoming calls waiting to be handled. Routing manager 54 receives incoming calls from the call queue manager 58 and assigns them to the appropriate agent as provided by the agent queue manager 56. The call routing function can be quite sophisticated, if desired. Because an incoming call may have associated with it a particular set of data obtained through previous interactive response or through web page input, the routing manager 54 has the ability to assign an incoming call to a selected agent that is appropriate for the nature of the incoming call. Best, an inquiry from a user regarding television sets would be routed automatically to an agent who handles that product line. An incoming call for a credit application would be routed to a different agent in the financial department.

At the core of the preferred embodiment is the ACD call model and its associated queues, depicted at 60. As will be more fully explained, the call model is an object-oriented model that combines internet content data and telephony data, keeping an association between both so that when a call is routed all previously obtained context information is routed with the call.

The presently preferred implementation interfaces with both telephony and internet media platforms. Thus the presently preferred ACD architecture includes a telephony and media platform layer 62 with its associated telephony and media interface module 64. This layer provides the physical connectivity interface with the telephone network and with the internet or computer network.

The application interface layer 42, server application layer 48 and data model layer 52 are preferably implemented using persistent storage as indicated diagrammatically at 66.

Because the user, agents, administrator and supervisor will all access the ACD system remotely in the preferred embodiments, the ACD architecture can be further divided into client side applications and server side applications. The client side applications include the GUIs in the GUI presentation layer 40. The server side applications comprise all of the applications and modules of the remaining layers.

Figure 3:
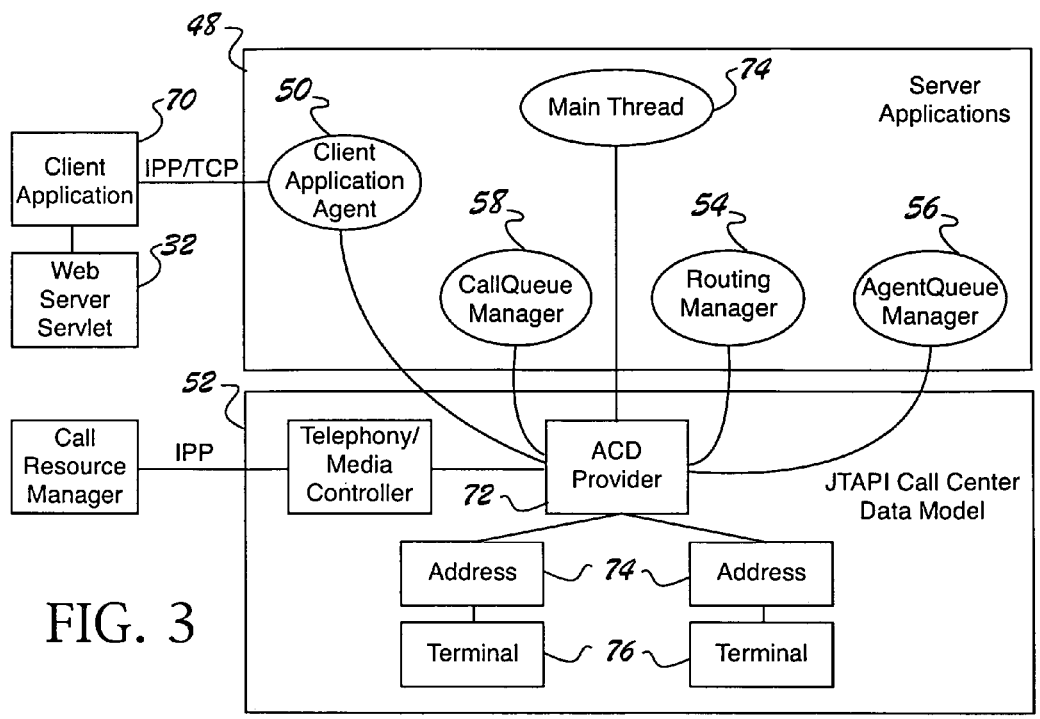
FIG. 3 is an object diagram illustrating the presently preferred automated call dispatching server components, including the server applications, data model and queues.
Figure 5:
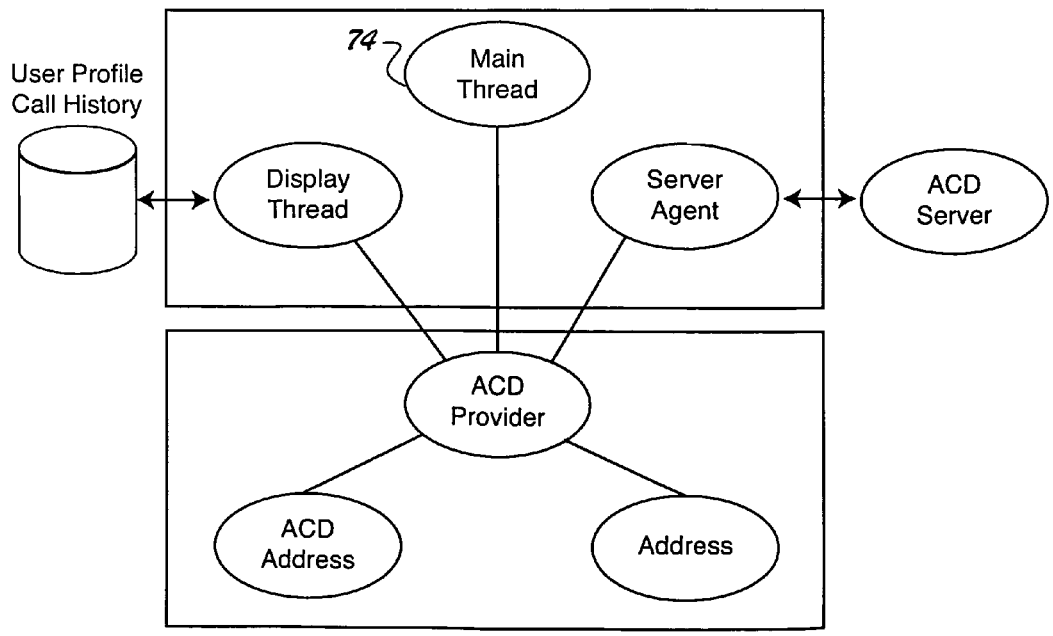
FIG. 5 is an object diagram illustrating how events are sent between client application and server application.

FIG. 3 shows the ACD server architecture in greater detail. The client application (which could be implementing any of the GUIs illustrated in FIG. 2) is shown in FIG. 3 at 70. It communicates using TCP/IP protocol or other suitable network protocol. The communication link can be implemented using HTTP, IPP, or the like, to specify the Uniform Resource Locator (URL) of the ACD server. As illustrated in FIG. 3, the client application 70 communicates with the client application agent 50 (a component of the server application layer 48 of FIG. 2). The client application 70 also communicates with the web server servlet 32 which may be deployed on the web server 30 (FIG. 1).

The client application agent 50 communicates with an ACD provider module 72 that is part of the call model 60 of the data model layer 52. The call queue manager 58, routing manager 54 and agent queue manager 56 also communicate with this ACD provider. The ACD provider's primary function is to maintain each call as a thread. The ACD provider instantiates threads for representing each call from a main thread 74 that has been diagrammatically illustrated in the server application layer 48. The main thread is the starting point of the server application. It controls the other ACD server application threads as well as the call model 60. The main thread has the ability to shut down modules and restart them. This gives the system the ability to perform run time updates of any of the modules making up the system.

The ACD provider module 72 maintains records in persistent storage of the addresses and terminal identification data of each party participating in a call. These address and terminal components of the call model are illustrated at 74 and 76, respectively.

To support internet web-based applications on the server side, the main thread can instantiate a web application thread. Web server servlet 32 sends requests to the web application thread through the IPP channel. Through the same channel, the web application thread sends information back to servlet 32. Servlet 32 then presents the information to the user's browser. This allows the system to pass content to the user's browser, thereby opening up interesting possibilities for interactive exchange. An agent at the help desk center or sales support office could, for example, cause information to be sent to an end user's web browser. Thus the agent could show the end user additional web content or multimedia content in response to a user's inquiry. A user interested in DVD players might be taken to a different web page where a particular model is described. The agent is able to control such action through the servlet functionality.

The routing application is one of the main functions of the ACD server. The ACD server takes calls from telephone, web or internet protocol terminal, and then finds an agent who can answer the call in the event the calling party wants to talk with an agent in person. The routing application identifies a suitable agent for each call based on predefined routing logic. Each agent has certain assigned duties and responsibilities, which are known to the routing application. Depending on the context of the user's call (which is determined through prior interaction with the user) the routing application selects an available agent who has the necessary qualifications to handle that type of inquiry.

Most of the time, management of the call center can be handled remotely by a supervisor or administrator with the help of the ACD client side application. On the server side, a client application controller thread responds to instructions from the supervisor or administrator and to send event and command messages to other client applications in response to the supervisor or administrator's instructions. Communication between the client and server applications takes place over a suitable communication channel. In the presently preferred embodiments the TCP socket and IPP mechanisms are used for this purpose. The client application can also communicate with a server application through the HTTP channel. In other words, client applications can send a request to a web server on the server side to invoke a servlet.

The servlet then communicates with the web application thread inside the server application. The web application thread processes the request and sends the results back. Web push technology can be used to return messages back to the client asynchronously.

As noted above, one embodiment of the invention provides a call back feature whereby the user is able to enter his or her telephone number into a field on a web page and the system will then call that person back, at the number provided, once an appropriate agent is available. This feature is implemented using a call back scheduling module that is part of the ACD server application. The call back scheduling module maintains a call back queue which sends a call request to the ACD call model.

Figure 4:
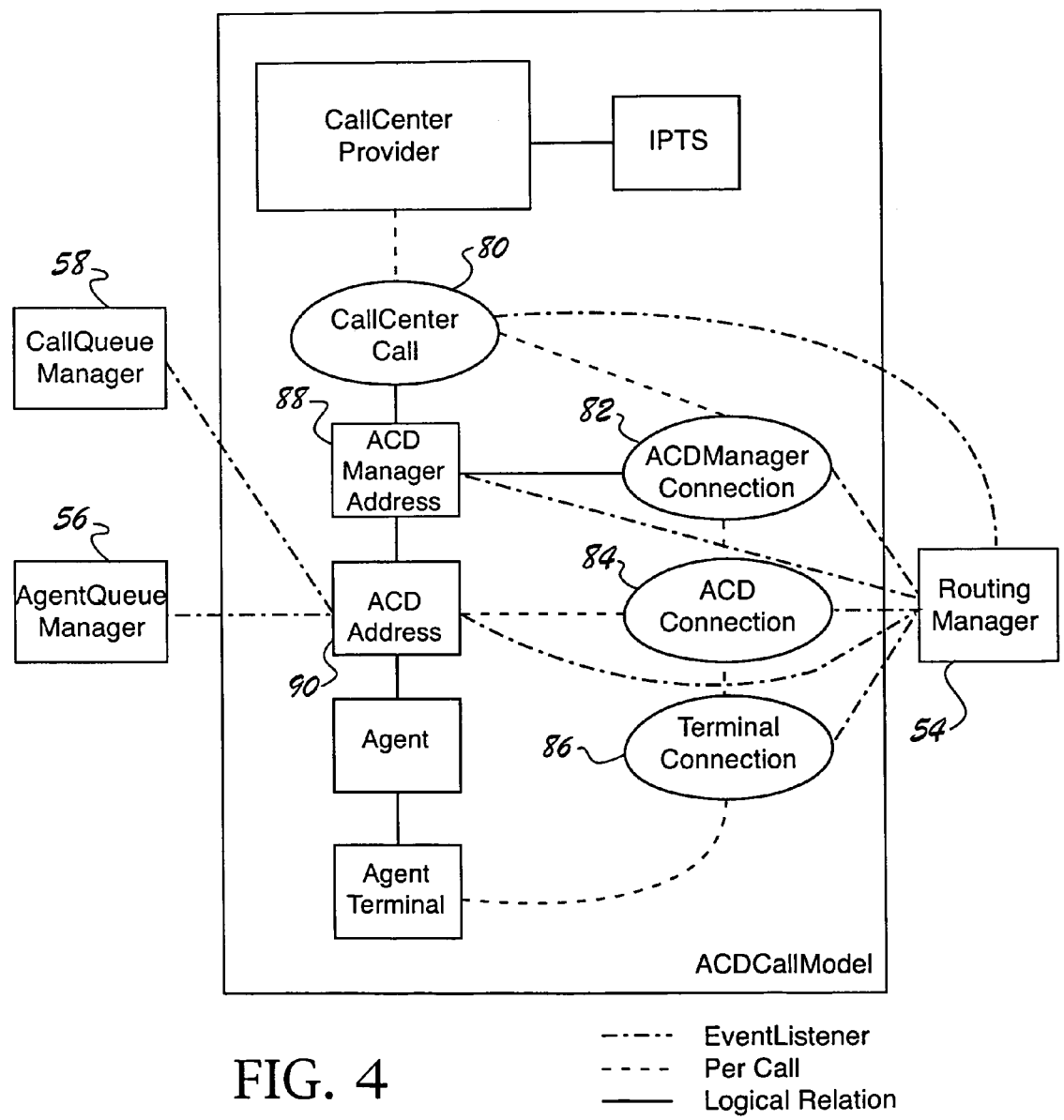
FIG. 4 is a detailed block diagram of the Call Model used by the automated call dispatching server.

In the preferred embodiments all communication between modules is done through the ACD call model. The call model provides a common data structure for all ACD server application threads. Basically, when one application threads wants to send an event notification to another application thread, it first changes the state of the call model object and then generates the event message. Thereafter, it invokes an event-listener state on the call model object to pass the event to the other application thread. FIG. 4 illustrates how such inter module communication occurs within the ACD call model. In FIG. 4 logical relationships among modules are shown in solid connecting lines. Event-listener operations are shown in dot-dash lines and per call communications are shown in dotted lines. The routing manager 54 listens for events from a number of the entities within the ACD call model, namely: the call center call object 80, ACD manager connection object 82, ACD connection object 84, terminal connection object 86, ACD manager address object 88, and ACD address object 90. The call queue manager 58 and the agent queue manager 56 also listen for events disseminated by the ACD address object 90.

Figure 6A:
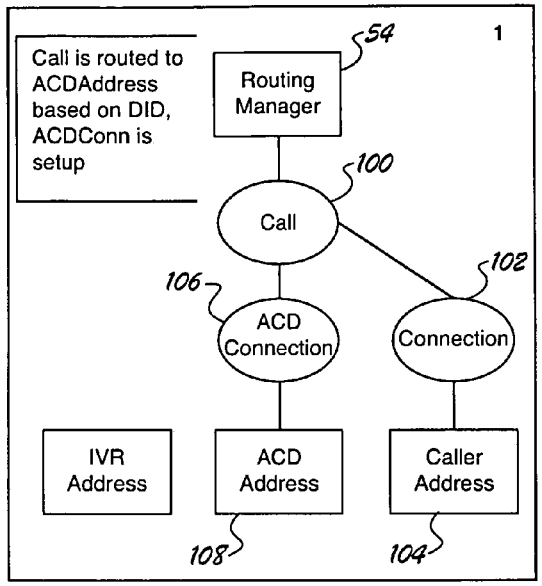
FIGS. 6A–6D comprise a series of call model object diagrams showing how a call is set up within the automated call dispatching server.

FIGS. 6A through 6D illustrate how the ACD call model supports call routing. Referring to FIG. 6A, the routing manager instantiates a call object 100 associated with a thread dedicated to the incoming call. The call object in turn associates a connection object 102 that is associated with the caller address 104 and an ACD connection object 106 that is associated with the ACD address 108. The ACD address may be a direct dial extension within the PBX system 24 (FIG. 1). Note that at this point the routing manager has established a connection relationship between the incoming caller and the ACD server system.

Figure 6B:
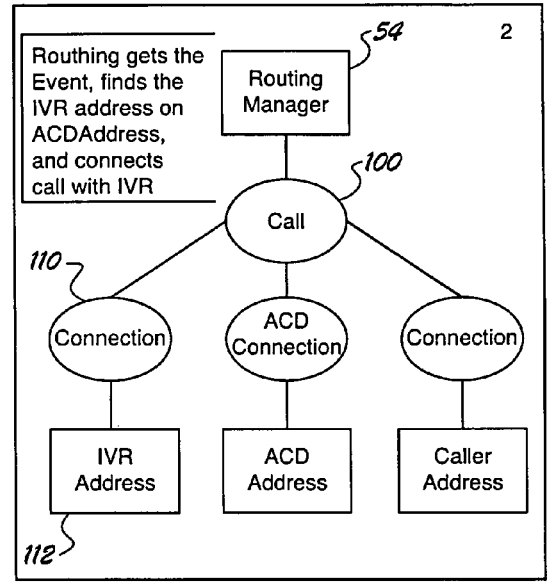

Next, as illustrated in FIG. 6B, the routing manager 54 causes call object 100 to associate a connection object 110 that is associated with an interactive voice response system address 112. The interactive voice response system may be used to elicit information from the caller, so that the system can appropriately route the call to the proper agent. Of course, the attachment of an interactive voice response system at this point is merely intended to illustrate one way of operating the invention. If, for example, the incoming call does not require interactive voice response services, then the routing manager would connect to other resources instead.

Figure 6C:
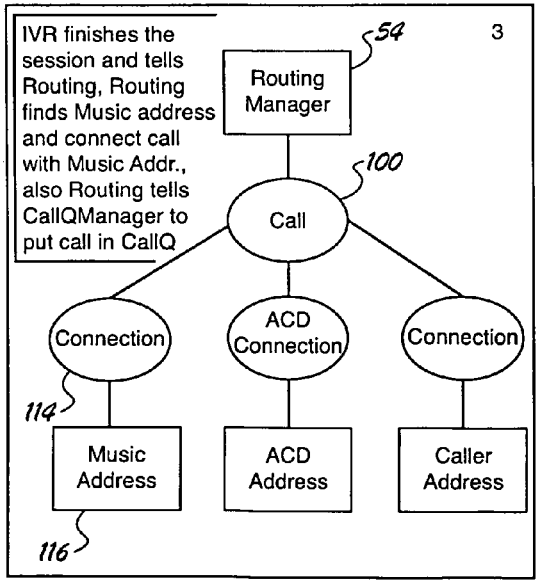
Figure 6D:
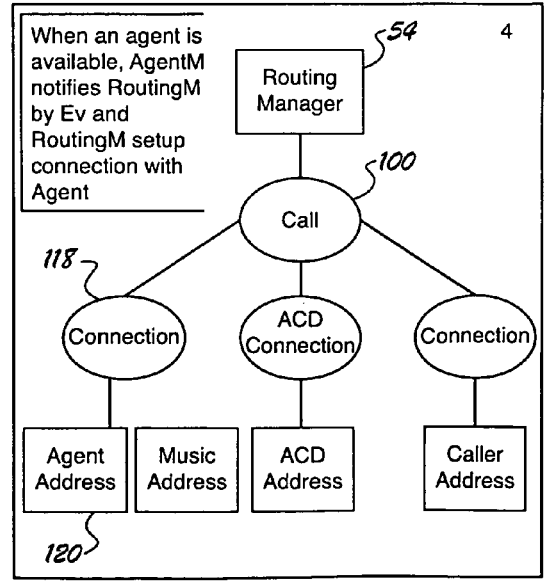

An example of such resource is shown in FIG. 6C. In FIG. 6C it is assumed that the interactive voice response session has finished and that the user is to be temporarily placed on hold while an appropriate agent can be identified and connected. The routing manager causes call object 100 to attach connection object 114 which is associated with the address 116 of a music system. Thus the incoming caller is entertained by a musical program while the routing is in process.

When an agent is available the agent queue manager 56 (FIG. 4) notifies the routing manager and a connection object 118 with knowledge of the agent's address 120 is associated with call object 100. This places the caller and agent in communication with one another, not only through the telephony channel but also through any web-based resources that the parties are using. The ACD connection object stores web-related resource information, such as information gathered via the servlet 32. In this way, the agent who picks up the incoming call has access to all information supplied by the caller through interaction over the web. Likewise, the agent has access to all information supplied by the caller during interaction with the interactive voice response system.

Figure 7:
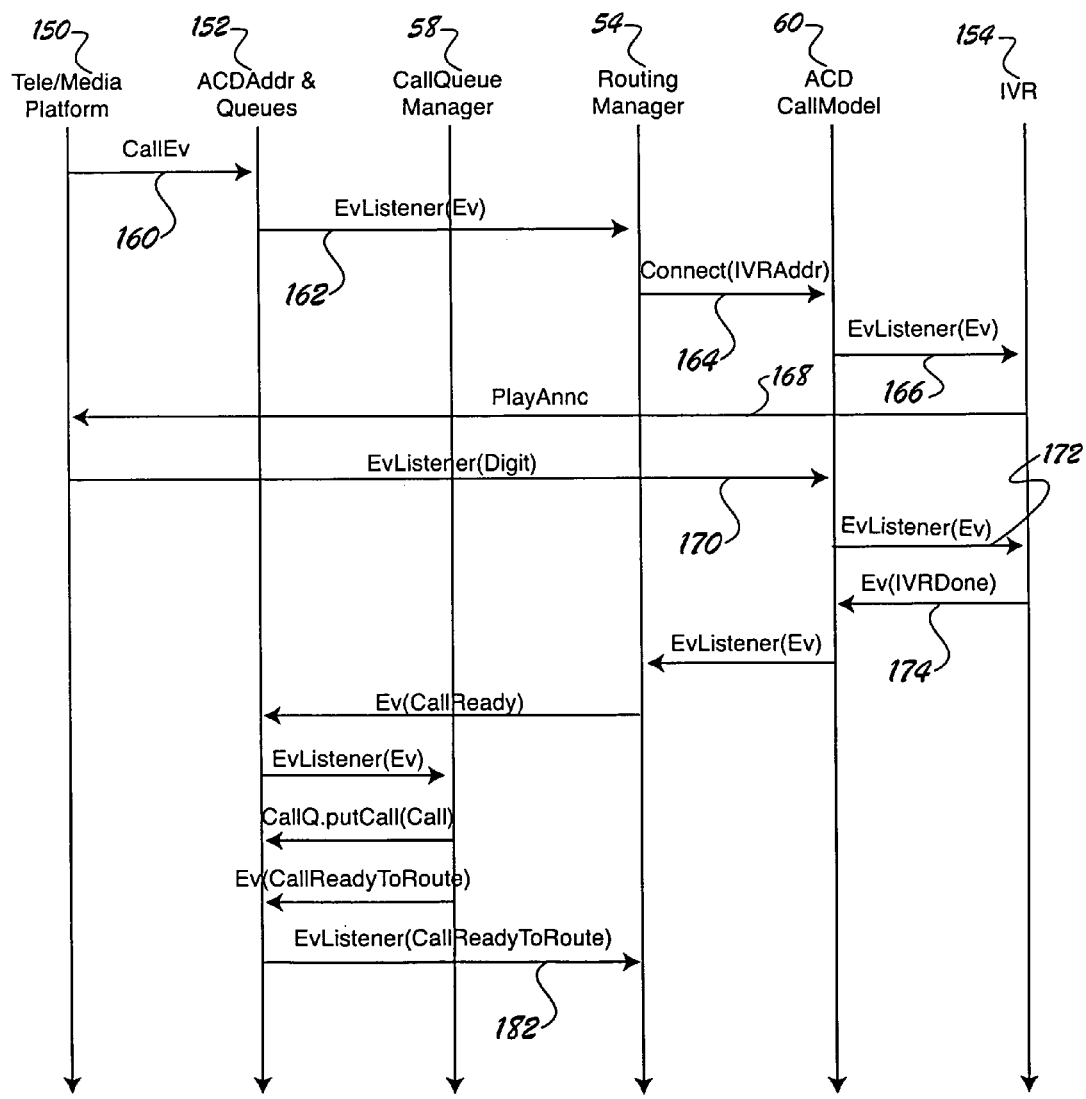
FIG. 7 is a sequence diagram showing the message flow between an interactive voice response system and the automated call dispatching system.
Figure 8:
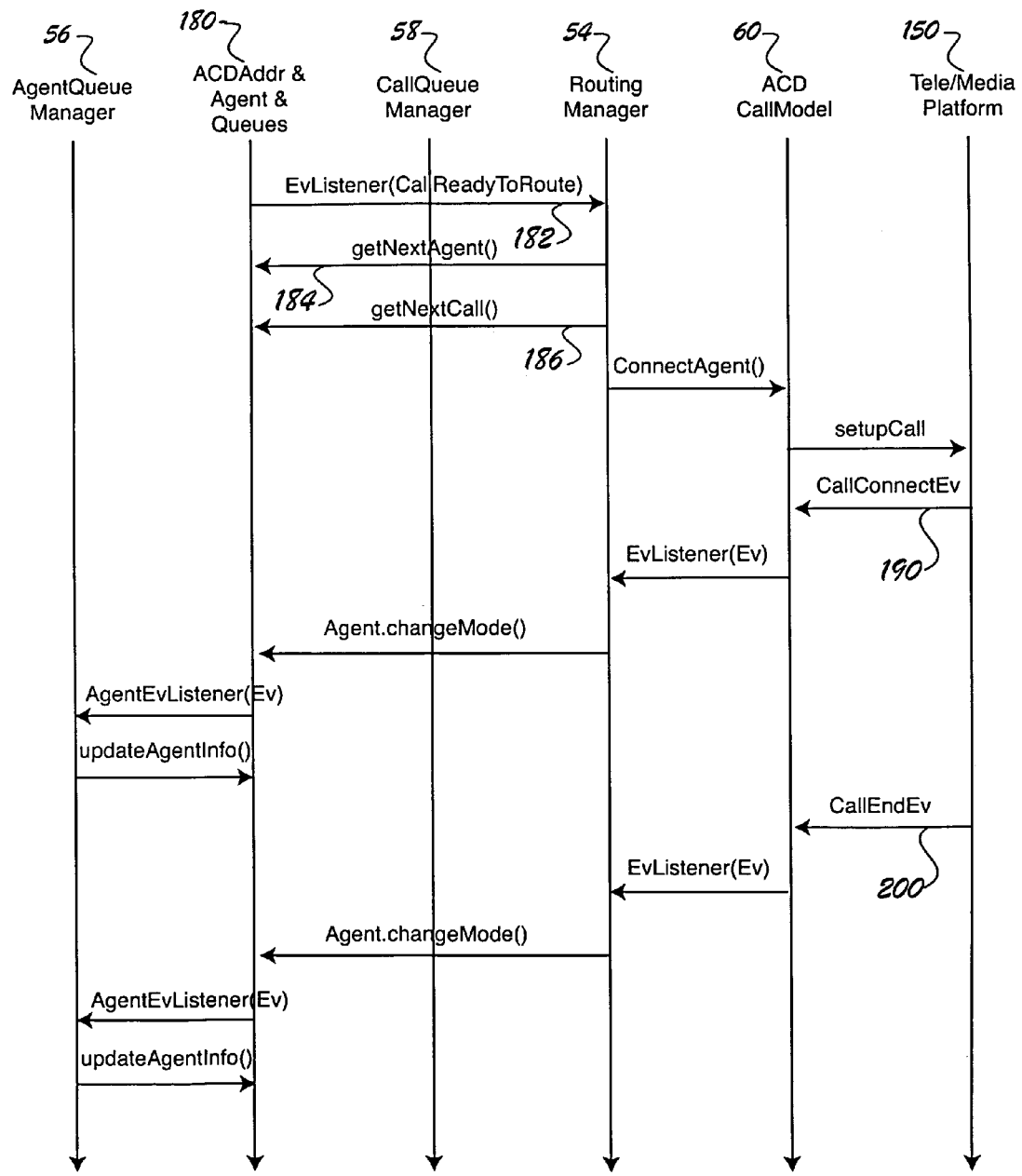
Figure 9:
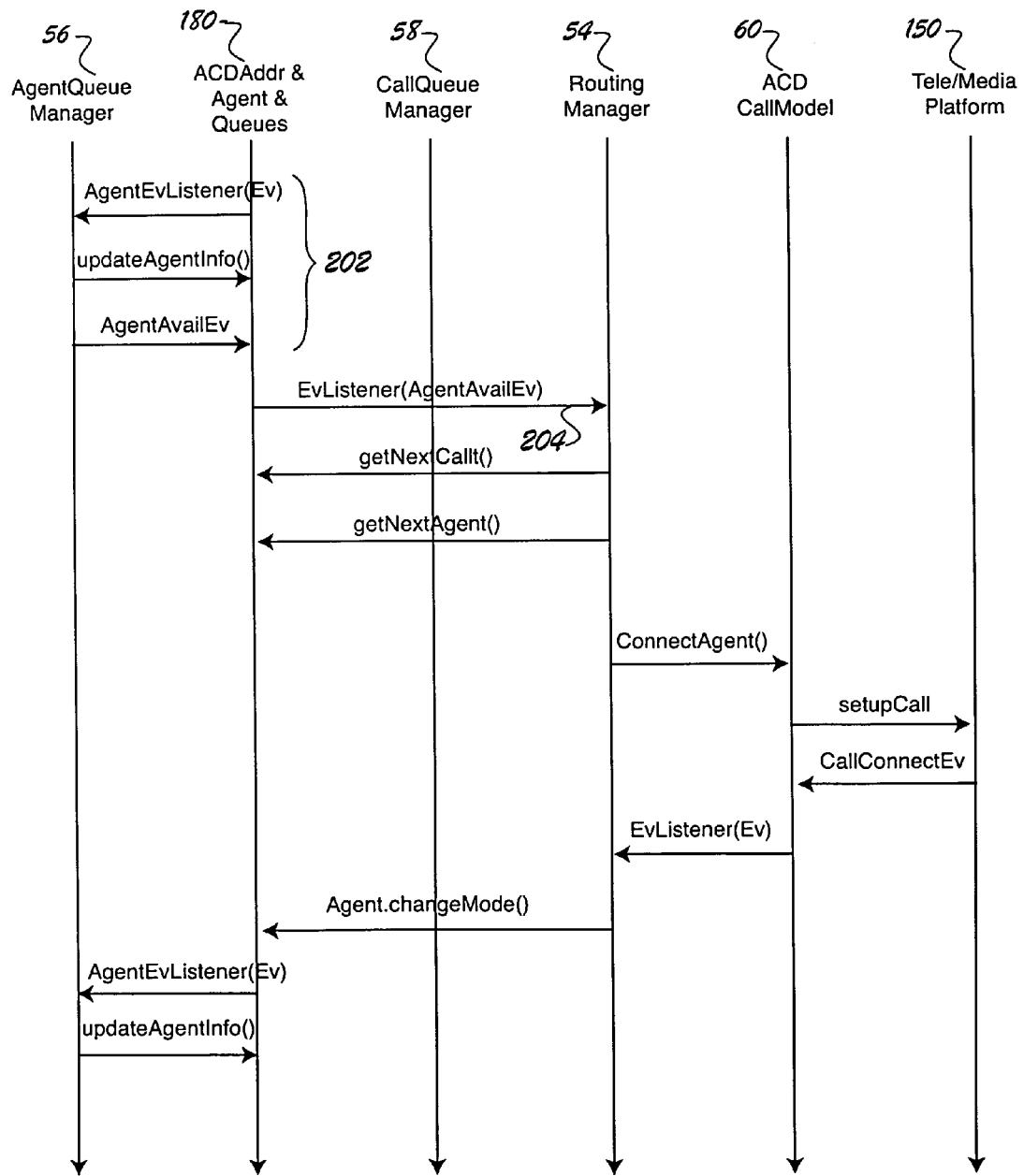
FIG. 9 is a sequence diagram illustrating message flow inside the automated call dispatching server when an agent is available to handle a new incoming call.

To further understand how the interaction transpires, refer to FIGS. 7, 8 and 9. FIG. 7 shows the message flow between the interactive voice response system and the ACD system. Specifically, FIG. 7 shows the sequence of messages that are passed among the following entities:

Telephony/media platform 150 (via the telephony media interface 64 of FIG. 2)
ACD address and queues 152 (see ACD address object 90 of FIG. 4)
Call queue manager 58 (see also FIG. 4)
Routing manager 54 (see also FIGS. 2, 4 and 6A–D)
ACD call model 60 (see also FIG. 2)
Interactive voice response system 154.

Each of the messages shown in FIG. 7 represents an event message if it contains the designation Ev in the message name. The first four event messages 160, 162, 164 and 166 essentially communicate a request to the interactive voice response system 154 to play an enunciation message 168 requesting the user to enter a numeric value on the telephone key pad. The next event message 170 is the digit entered by the user. As illustrated, this digit is sent to the ACD call model 60. The ACD call model 60 notifies the interactive voice response system that a digit has been received (message 172) and the interactive voice response system may either send out a further play enunciation to the user or it can signify (message 174) that the interactive session is done. This indication results in a cascade of messages that ultimately notify the ACD address and queues object 152 that the call is ready to be routed.

FIG. 8 is a similar diagram illustrating how messages are passed within the ACD when a new call is processed after the interactive voice response session. As illustrated, messages are passed among the following entities:

Agent queue manager 56 (see also FIGS. 3 and 4)
ACD address and agent queues 180 (see ACD address object 90 of FIG. 4)
Call queue manager 58 (see FIG. 4)
Routing manager 54 (see FIGS. 2 and 4) ACD call model 60 and telephony media platform 150.

The timeline of FIG. 8 begins with a call ready to route message 182, which is also the final message of the time line of FIG. 7. In response to this message the routing manager 54 gets the next available agent from the agent queue (message 184), get the call from the call queue (message 186) and then instruct the ACD call model 60 to implement the connection. More specifically, the routing manager 54 sends a message to the ACD call model which causes the agent to be connected to the call object (see FIG. 6D). The incoming caller is presumed to already be attached to the call object in this example, as was illustrated in the sequence of FIGS. 6A–6D. In FIG. 8 the actual connection of the call is signified by an event message 190, which is sent from the telephony/media platform 150 to the call model. Thereafter, a cascade of messages are sent to tell the agent queue manager 56 that the selected agent is now handling the call and should therefore be removed from the queue. When the call ends, a similar message 200 is sent, causing the agent to be placed back in the queue.

FIG. 9 shows a similar sequence of events that would occur when an agent is available to take a new call. In this case, a sequence of messages 202 are sent between the agent queue manager 56 and the ACD address and agent queues 180 prior to notifying the routing manager 54 that an agent is available to take the call (message 204). Thereafter, the exchange of messages is similar to that illustrated in FIG. 8.

Distributed Service Logic Programs (SLP)

There are various kinds of service logic programs (SLPs). The common feature of a SLP is that it can be created in any development tools and compiled into a software components that can be loaded and run in a host machine with a standard XML interface that defines the following typed interface:

1. The SLP can be located anywhere in the internet. It has a URL and a property set describing the following properties.
2. SLP has a shared object service interface defining an event-condition-action table that can be dynamically updated. The interface can point to
   a. All the call object information dynamically created by the call processing system.
   b. All the context information collected from the user or the system during the course of the call.
3. A GUI component that support the provisioning of the SLP parameters. The GUI component support the remote update of the SLP. It also support the tracking of SLPs that has been used by other entities. When there is a change to the SLP the other entities may be notified if the entity "subscribed to or is using the SLP".
4. A set of system service interface for making calls, collect user information, and play media to the users.
5. A set of declarative rules or procedure based program that can communicate with external programs using structured messages such as XML.
6. SLP can be loaded and dynamically link to the SLP execution engine to implement the application logic.
7. SLP can be dynamically associated with an addressable entities. The association allows a call processing program to locate the reference to the SLP from the addressable entity. It also allows the SLP to find the call processing program from the addressable entities. It is assumed that the call processing entity has a reference to the addressable entities.

The dynamic loading of SLP is accomplished by a web based hyperlink dictionary (WHD). WHD keeps the location of SLPs that is used by the applications and has the knowledge of how to locate SLP.

Web-Centric Hyperlink Dictionary (WHD)

Conventional database systems provide data sharing capability for users to define and manipulate corporate information. Current Internet provides browsers and HTTP servers for sharing Web pages and common gateway interface programs. The scope of information sharing was extended to Web page sharing. In such an environment, the internet becomes the common protocol for distributed machines (IP terminals and Servers). On top of the IP protocols, HTTP becomes the most common protocol that is used by internet communities. Many of the new generation tools are transformed from enterprise or departmental centric computing environment to a totally distributed Web-centric environment.

Figure 10:
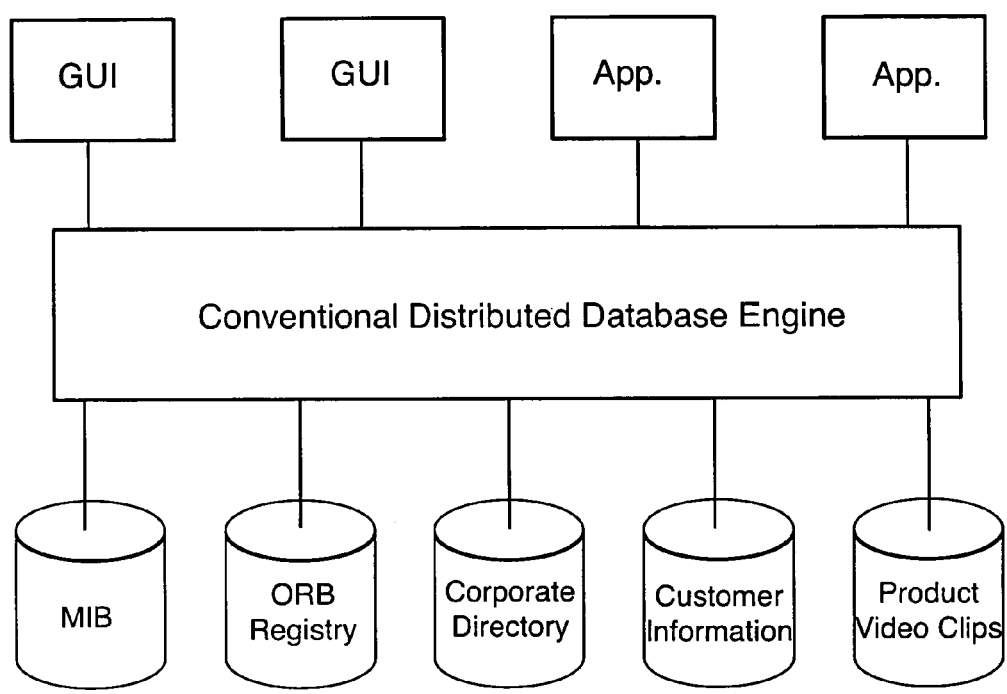
FIG. 10 is a block diagram illustrating a conventional distributed database engine, useful for understanding how the present invention differs.

Many vendors provide a Web-enabled wrapper over database systems to take advantage of the Web. However, these approaches are not suitable for truly distributed multimedia applications where users are basically distributed over Internet domains separated by firewalls. There are no easy and low cost methods to deliver information between users if the information is stored in conventional databases. Furthermore, because conventional databases use data storage and transport protocols developed before the invention of HTML and XML, a substantial amount of translation is needed to support multimedia display, encoding and storage. Refer to FIG. 10 for a depiction of how conventional databases use data storage and transport protocols.

Figure 11:
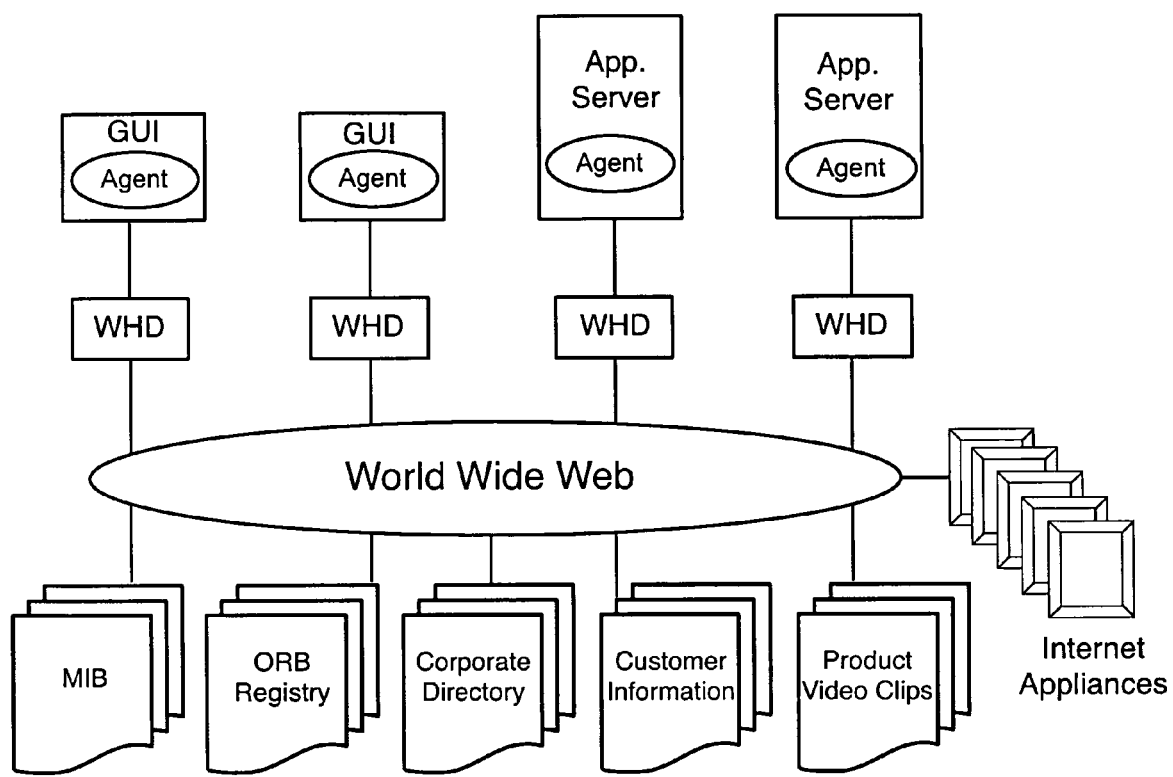
FIG. 11 is a block diagram illustrating the Web Hyperlink Dictionary (WHD) that manages URLs and properties of URLs in accordance with the present invention.

Based on the above observation, we propose a Web-centric data management scheme to support distributed internet multimedia applications. Illustrated in FIG. 11, the main function to be provided is a meta-database call Web Hyperlink Dictionary (WHD) that manages URLs and properties of the URL for multimedia objects. The WHD can provide efficient search and update capability to various HTML and XML encoded information. Furthermore, the WHD can provide direct manipulation of controllable internet appliances such as camera, telephone, and switches. WHD maintains all the control and linkage information needed to support the interactive 'message based' information exchange between active programs (agents) running in different machines either as client or as server.

Using the WHD, the WCC system support a unified contact center operation. For example, when a call, chat or email goes to the ACD system, ACD will check the service logic based on the destination address input from call, chat or email and system time. The service logic is preloaded to the system from our WHD. If the supervisor or administrator changes the service logic, the new service logic will be saved to WHD and updated information will be passed to whoever are interested in the change through Share Object Service. If the destination address does not have a service logic program associated with, ACD system will connect the signal with destination address such as call queue, email system, music and video. If the destination address has service logic, the ACD system will continue to execute the service logic until reach to end of points.

Unlike prior systems, the system of the present invention advantageously unifies the following entities:

1. Multimedia message types: Chat, Web page, Form, Voice, and Video.
2. Virtual addressable entities: An addressable entities that can be an user, agent, supervisor, manager, administrator, group, department, company, and communities are all modeled as a virtual group of different size and can be linked in a hyper graph. The graph can be cyclic.
3. Unified contact rules: Time, space, preference, performance, security, and other routing control parameters are modeled as SLP and SLP is distributed by virtual groups. It can be based on any user definable rules for routing. For example, users can define the rules based upon the time when the message is received. Users can construct hierarchical addressable entities and specify business rules using SLP. The multimedia messages can be routed through the SLP hierarchy.
4. The rules can be defined interactively through user friendly user interface from any where any time. The modification of the rule can be verified and propagated to distributed locations where WCC is deployed to.

Figure 12:
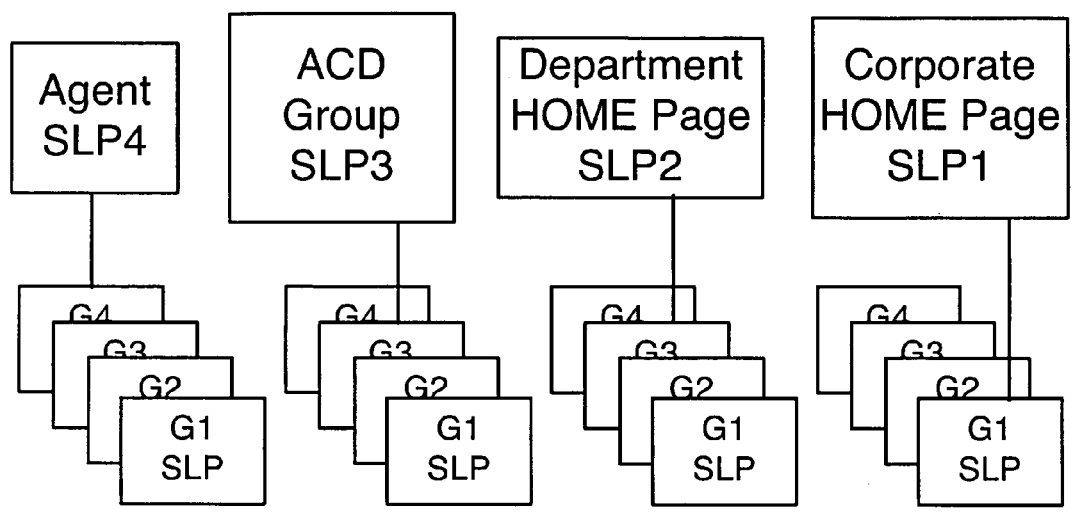
FIG. 12 is a block diagram illustrating one example of how SLPs may be utilized in accordance with the present invention.

To better understand the capabilities of the present invention, the following will present examples of SLPs in use. Refer to FIG. 12 when considering these examples.

Examples of SLP:
1. Multimedia Customer Interaction (MCI) SLP. The MCI SLP connects to a caller when all the agents are busy. The MCI SLP can collect the user input from an instant messaging channel, voice channel, and data channel. The MCI SLP can push Web pages, input form, video link, and other Web content to the caller. For example, a simple pseudo code of the script can be: "if the all agent is busy, play music at URL c:\\imaserver\\wav\\music1.wav" for the call." And "If the all agent is busy, display message "All agents are busy now" for the Instant Message."
2. Multi-level Call Routing SLP: The MCR SLP can route the call based on the information collected from the MCI SLP. The MCR SLP can route the call to next MCR SLP based on a set of rules specified in a set of executable software component linked by a script language. SLP can execute sequentially or in parallel.
3. Personal Assistance SLP: PA SLP supports advanced call control features such as routing calls based on contents of shopping cards or user input questions. PS SLP also provide the linkage to connect to external data and knowledge base to assist the agent in supporting and customers.

---

The XML representation listed in the following are for illustration purposes.

```
<?xml version="1.0"?>
<!DOCTYPE entity SYSTEM 'http://127.0.0.1/whddir/slp/dtd/Entity.dtd'>
<entity id="playMessage"xmlns:xlink="http://www.w3.org/1999/xlink">
    <schema idref="SlpPlayMessageSchema"
xlink:href="/slp/acdslp/schema/SlpPlayMessageSchema.xml"/>
    <property name="handleLink" value="playMessage"/>
    <property name="errorLink" value="playMessage"/>
    <property name="message" value="All agents are busy now"/>
    <property name="messageURI"
value="c:\\imaserver\\wav\\music1.wav"/>
    <property name="interval" value="20"/>
    <property name="duration" value="20"/>
    <property name="repeat" value="1"/>
</entity>
```
Record the user's input
```
<?xml version ="1.0"?>
<!DOCTYPE entity SYSTEM
'http://192.168.1.113/whddir/slp/dtd/Entity.dtd'>
<entity id="recordMessage61"
xmlns:xlink="http://www.w3.org/1999/xlink">
    <schema idref="RecordMessageSchema"
xlink:href="/slp/ivr/schema/RecordMessageSchema.xml"/>
    <property name="handleLink" value="disconnectCall61"/>
    <property name="errorLink" value="slp_engine_stop"/>
    <property name="fileURI" value="/whddir/slp/ivr/test6/rec61"/>
    <property name="duration" value="60"/>
    <property name="signal" value="#"/>
</entity>
```
Routing based on different media channel such voice, web and instant message
```
<?xml version ="1.0"?>
<!DOCTYPE entity SYSTEM
'http://192.168.1.113/whddir/slp/dtd/Entity.dtd'>
<entity id="chooseMenuItemRoot9"
xmlns:xlink="http://www.w3.org/1999/xlink">
    <schema idref="ChooseMenuItemSchema"
xlink:href="/slp/ivr/schema/ChooseMenuItemSchema.xml"/>
    <property name="unhandleLink" value="playErrorMessage91"/>
    <property name="errorLink" value="slp_engine_stop"/>
    <property name="timeoutLink" value="playTimeoutMessage91"/>
    <property name="DTMF1Link" value="collectInput91"/>
    <property name="WebLink" value="collectUserWebInput"/>
    <property name="InstantMessage" value="collectUserIMInput"/>
    <property name="timeout" value="20"/>
    <property name="mscStreamURIs"
value="/whddir/slp/ivr/Voice/rootMenu9.wav"/>
    <property name="IMmscStreamURIs"
value="/whddir/slp/ivr/IM/rootMenu9.wav"/>
</entity>
```
Collect digits from Phone
```
<?xml version ="1.0"?>
<!DOCTYPE entity SYSTEM
'http://192.168.1.113/whddir/slp/dtd/Entity.dtd'>
<entity id="collectInput51"
xmlns:xlink="http://www.w3.org/1999/xlink">
    <schema idref="CollectInputSchema"
xlink:href="/slp/ivr/schema/CollectInputSchema.xml"/>
    <property name="handleLink" value="disconnectCall51"/>
    <property name="unhandleLink" value="playErrorMessage51"/>
    <property name="errorLink" value="slp_engine_stop"/>
    <property name="timeoutLink" value="playTimeoutMessage51"/>
    <property name="mscStreamURIs"
value="/whddir/slp/ivr/test5/msg51.wav"/>
    <property name="initialTimeout" value="10"/>
    <property name="interSigTimeout" value="10"/>
    <property name="lastDigit" value="0"/>
    <property name="maxLength" value="9"/>
    <property name="field" value="SSN"/>
</entity>
```
Schema for SLP play message
```
<?xml version="1.0"?>
<!DOCTYPE taskSchema SYSTEM
'http://127.0.0.1/whddir/slp/dtd/TaskSchema.dtd'>
<taskSchema>
    <description>
        <abstract>Play the message to customer</abstract>
        <licence href="licence, html"/>
        <servletCondition>2.1</servletCondition>
        <jspCondition>1.1</jspCondition>
        <jvmCondition>1.2</jvmCondition>
        <preCondition>
        </preCondition>
        <postCondition>
        </postCondition>
    </description>
    <entitySchema>
    <bean
        class="ima.wacd.SLP.bean.SendMessage"/>
    <constrain
        field="handleLink"
        role="link"
        type="string"
        availability="required"
        isBeanField="true">
    </constrain>
    <constrain
        field="errorLink"
        role="link"
        type="string"
        availability="required"
        isBeanField="true">
    </constrain>
    <constrain
        field="message"
        role="data"
        type="string"
        availability="implied"
        isBeanField="true">
    </constrain>
    <constrain
        field="messageURI"
        role="data"
        type="string"
        availability="implied"
        isBeanField="true">
    </constrain>
    <constrain
        field="interval"
        role="data"
        type="string"
        availability="implied"
```

-continued

```
            isBeanField="true">
        </constrain>
        <constrain
            fieid="duration"
            role="data"
            type="string"
            availability="implied"
            isBeanField="true">
        </constrain>
        <constrain
            field="repeat"
            role="data"
            type="string"
            availability="implied"
            isBeanField="true">
        </constrain>
    </entitySchema>
</taskSchema>
Schema for routing to different media channel
<?xml version="1.0"?>
<!DOCTYPE taskSchema SYSTEM
'http://192.168.1.113/whddir/slp/dtd/TaskSchema.dtd'>
<taskSchema>
    <description>
<abstract>Play a menu prompt, then take the branch based on user selection</abstract>
<licence href="licence.html"/>
<servletCondition>2.1</servletCondition>
<jspCondition>1.1</jspCondition>
<jvmCondition>1.2</jvmCondition>
<preCondition></preCondition>
<postCondition></postCondition>
    </description>
    <entitySchema>
    <bean
        class="ima.ivr.ChooseMenuItem"/>
    <constrain
        field="errorLink"
        role="link"
        type="string"
        availability="required"
        isBeanField="true">
        </constrain>
        <constrain
            field="unhandleLink"
            role="link"
            type="string"
            availability="required"
            isBean Field="true">
        </constrain>
        <constrain
            field="timeoutLink"
            role="link"
            type="string"
            availability="required"
            isBeanField="true">
        </constrain>
        <constrain
            field="loopbackLink"
            role="link"
            type="string"
            availability="implied"
            isBeanField="true">
        </constrain>
        <constrain
            field="maxLoopbacks"
            role="data"
            type="string"
            availability="implied"
            isBean Field="true">
        </constrain>
        <constrain
            field="mscStreamURIs"
            role="data"
            type="string"
            availability="required"
            isBeanField="true">
        </constrain>
        <constrain
```

-continued

```
            field="timeout"
            role="data"
            type="string"
            availability="implied"
            isBeanField="true">
        </constrain>
        <constrain
            field="DTMF0Link"
            role="link"
            type="string"
            availability="implied"
            isBeanField="true">
        </constrain>
        <constrain
            field="DTMF1Link"
            role="link"
            type="string"
            availability="implied"
            isBeanField="true">
        </constrain>
        <constrain
            field="DTMF2Link"
            role="link"
            type="string"
            availability="implied"
            isBeanField="true">
        </constrain>
        . . .
        <constrain
            field="DTMFStarLink"
            role="link"
            type="string"
            availability="implied"
            isBeanField="true">
        </constrain>
        <constrain
            field="DTMFHashLink"
            role="link"
            type="string"
            availability="implied"
            isBeanField="true">
        </constrain>
        <constrain
            field="WebLink"
            role="link"
            type="string"
            availability="implied"
            isBeanField="true">
        </constrain>
        <constrain
            field="InstantMessage"
            role="link"
            type="string"
            availability="implied"
            isBeanField="true">
        </constrain>
    </entitySchema>
</taskSchema>
```

From the foregoing it will be appreciated that the invention may be implemented as an object-oriented, agent-based server system. Although the presently preferred embodiments employ object oriented technology, the invention can be implemented in other ways without departing from the spirit of the invention as set forth in the appended claims.

What is claimed is:

1. A Web-content aware automatic call transfer system, comprising:
    a call transfer system architecture; and
    an execution model that enables mobile users and operators to control call transfer flow dynamically between users, multiple contact persons, and entities in a distributed Web Contact Center using a set of customizable Service Logic Program (SLPs), wherein said call transfer system architecture, includes:

server applications sharing a Web content aware call model and a Web Hyperlink Dictionary (WHD) manager, said server applications adapted to be implemented as a subsystem of a communication server referred to as an Automated Call Dispatch (ACD) server with interfaces to external client application machines, Web servers, and PBX connected to a conventional telephony network, wherein the Web content aware call model unifies: (i) multi-media messages and content including one or more of Chat, Web page, Form, Voice, and video; (ii) addressable entities representing contact persons and entities including one or more of agents, supervisors, interactive response systems, mail boxes, and department Web sites in a distributed Web contact center environment; (iii) unified contact rules with routing control parameters, including one or more of time, space, preference, performance, and security; and (iv) a user interface to define, modify, and propagate a change to one or more distributed locations at which the contact center is deployed, wherein the WHD is a meta-database supporting efficient search and update capability to distributed Internet content encoded in HTML and XML, providing: (i) direct manipulation of directly controllable Internet appliances; (ii) maintenance of information needed to support an interactive message based exchange between active programs (agents) running in different machines either as one or more of a client or a server; (iii) dynamic loading of new and modified SLPs from distributed locations (iv), and notification of server applications for updated SLPs, wherein said server applications: (a) include: (i) Call Queue Agents; (ii) Client Application Agents; (iii) Agent Queue Managers, and (iv) Routing managers implemented in one or more multi-threaded software modules; (b) dynamically load and execute SLPs from the WHD; (c) create and modify unified call objects stored in the unified Web content aware Call Model; and (d) listen to changes in the SLPs and the WHD, wherein said Web content aware call transfer system is capable of executing distributed service logic programs from distributed Web-based hyperlink dictionary that store locations of service logic programs used by applications and thereby accomplish loading of the service logic programs by the ACD server, at least one interface communicates messages to the server to allow a user to specify a set of said service logic programs by dynamically attaching the set of service logic programs to addressable entities within the distributed Web contact center, and one or more SLPs has a URL and set of properties, including:

(a) remote accessibility by server applications through the WHD from the Internet;

(b) a shared object service interface defining a data structure that can be dynamically updated and provide notification to server applications that are interested in the change of SLP in WHD and data in call models, said shared object service interface pointing to call object information dynamically created by the call processing system, and context information collected from at least one of the user or the system during the course of a call;

(c) GUI supporting provisioning of SLP parameters, tracking changes, and providing notifications to server applications that one or more of subscribed to or are using the SLP;

(d) a set of system service interfaces for making calls, collecting user information, and playing media to users;

(e) a set of programs adapted to communicate with external programs using structured messages;

(f) a property that the service logic program can be loaded and dynamically linked to a service logic program execution engine to implement call transfer control application logic; and (g) a property that the service logic program can be dynamically associated to addressable entities, wherein the dynamic association allows a running call processing program to locate a reference to the SLP for the addressable entities.

2. The system of claim 1 wherein said routing manager of the server applications routes calls based on a set of customizable and dynamically modifiable rules defined in one or more of the SLPs that are attached to the addressable entities, including one or more enterprise home page links, department home page links, agent group links, and agent links that reside in different locations transparently using the WHD, and changing of the rules in the SLP can dynamically alter a call transfer decision to next addressable entities while the call is in transition until reaching a contact point end.

3. The system of claim 1 wherein said routing manager routes calls based at least in part upon Internet content data collected and stored in a Web content aware call object, and the Internet content data can be propagated to different SLPs as the call is transferred from one entity to another in a distributed contact center environment.

4. The system of claim 3 wherein said Internet content data includes user selection data and wherein said routing manager routes calls based on said user selection data.

5. The system of claim 3 wherein said server applications running in a multithreaded environment use the shared object interface in said SLPs to notify changes, share an internal call model, and access Web content via the WHD so that a context of interactions between a user and agents can be transferred and accessed by multiple agents concurrently.

6. The system of claim 3 wherein said Internet content data is linked with said call model and information is managed by the WHD so that changes in the Internet content data by the GUI or other applications using the WHD are monitored and result in notifications to server application threads.

7. The system of claim 3 further comprising a call back scheduling module that performs a call back function by maintaining a call back queue and generating call requests; said ACD server being responsive to said call requests to initiate a call to a third party via a telephony interface; said call back function being enriched by a personal assistant SLP which can use previously collected Internet content, including one or more of shopping card information and information stored in an external data and knowledge base to assist an agent to provide a response to a customer.

8. The system of claim 3 wherein said routing manager selectively routes calls to an interactive response system that has a SLP that can be dynamically attached with a second SLP provisioned by a mobile agent and supervisors to prompt at least one party with one or more of new available agents or new Web content.

9. The system of claim 8 wherein said routing manager selectively routes calls to an interactive response system for prompting at least one party to supply user selection data via said telephony interface.

10. The system of claim 1 further comprising a network-based customer contact system, including:
 call transfer system server applications distributed over a network of distributed ACD servers that are capable of executing distributed service logic programs from multiple distributed WHDs and thereby accomplish dynamic loading and binding of a set of distributed service logic programs with a set of distributed addressable entities by said server interfaces to external Internet, telephone network and mobile devices; and
 at least one interface that communicates messages to allow a user to specify a set of said service logic programs by dynamically attaching said set of said service logic programs to addressable entities using said WHD.

11. The system of claim 10 wherein said addressable entity is a user of the customer contact system with a SLP run by a client application agent controlling interaction with server applications to implement Web push, input collection, and Web content search and update functions.

12. The system of claim 10 wherein said addressable entity is an agent residing on the network associated with said customer contact system with a dynamic changeable SLP that can support an agent working in different addresses in different locations using different devices.

13. The system of claim 10 wherein said addressable entity is an e-mail box with a SLP that can promote real time contact by attaching an email to a call object and transferring a call to a group of agents.

14. The system of claim 10 wherein said addressable entity is a workgroup with a SLP that can be customized for load balancing and call transfer based on agent qualification.

15. The system of claim 10 wherein said addressable entity is an interactive voice response system associated with a SLP that monitors messages received from a client application, said messages including search and update operations on a cached WHD.

16. The system of claim 10 wherein said addressable entity is a Web site with a SLP that tracks search and update operations to the content of the Web site from the WHD, wherein the said SLP can be modified dynamically to provide information.

17. The system of claim 10 further comprising interface for communicating with workflow-based graphical user interface programming tool.

18. The system of claim 10 for use in call center applications, further comprising routing rule system in the form of SLPs for download and execution of routing rules and system for applying said routing rules for each incoming message to each addressable entity in the distributed server applications in the networked distributed call center environment.

19. The system of claim 10 wherein said service logic programs embed machine instructions that mediate how customer messages are handled by an organization.

20. The system of claim 10 wherein said service logic programs embed business logic rules that mediate how messages are handled, where messages are selected from the group consisting of telephone call messages, Internet-based chat messages, e-mail messages, video messages, form text messages and Web page messages.

21. The system of claim 10 wherein said interface conforms to a predefined markup language protocol.

22. The system of claim 21 wherein said protocol is the XML protocol.

23. A network-based distributed customer contact system supporting multi-media messaging using a Web Content Aware call processing model, the system comprising:
 a system that associates a unified call identifier with a first message of a first media type and a second message of a second media type;
 a message routing system that uses said unified call identifier to link said first message and said second message as one Web content aware messaging call to separate addressable entities located in different locations within a distributed contact center, wherein one or more of said messages includes one or more of instant messaging using different protocols, voice messaging, or video messaging;
 at least one server that is capable of executing distributed SLPs from distributed WHD that stores locations of service logic programs used by distributed applications and thereby accomplishing loading of the service logic programs by said server;
 at least one interface that communicates messages to said server to allow a user to specify a set of said service logic programs by dynamically attaching said set of said service logic programs to addressable entities within said customer contact system,
 wherein a service logic program has a URL and set of properties, including:
 (a) remote accessibility by server applications through the WHD from the Internet;
 (b) a shared object service interface defining a data structure that can be dynamically updated and provide notification to server applications that are interested in the change of SLP in WHD and data in call models, said shared object service interface pointing to call object information dynamically created by the call processing system, and context information collected from at least one of the user or the system during the course of a call;
 (c) GUI supporting provisioning of SLP parameters, tracking changes, and providing notifications to server applications that one or more of subscribed to or are using the SLP;
 (d) a set of system service interfaces for making calls, collecting user information, and playing media to users;
 (e) a set of programs adapted to communicate with external programs using structured messages;
 (f) a property that the service logic program can be loaded and dynamically linked to a service logic program execution engine to implement call transfer control application logic; and
 (g) a property that the service logic program can be dynamically associated to addressable entities, wherein the dynamic association allows a running call processing program to locate a reference to the SLP for the addressable entities.

24. The system of claim 23 further comprising at least one interface to allow a user to specify a set of routing decision rules by which said message routing system routes said messages during the course of call transfer to multiple entities.

25. The system of claim 24 further comprising a data structure that associates said routing decision rules in the form of SLP with a virtual group entity with multiple mobile agents in a distributed location to obtain different parts of the messages from the same Web contact call generated by a user.

26. The system of claim 25 wherein said virtual group represents entities selected from the group consisting of user, agent, supervisor, manager, administrator, work group, department, company, communities and combinations thereof.

27. The system of claim 24 wherein said routing decision rules are represented as at least one hyperlink graph that links distributed addressable entities.

28. The system of claim 27 wherein said graph is cyclic.

29. The system of claim 10 wherein the system uses a call transfer model where a unified context of interaction between said addressable entities modeled in a call object in real-time are transferred from a first one of said service logic programs attached to the first one of said addressable entities to a second one of said service logic programs attached to a second one of said addressable entities in a different location and said model supports independent customization and execution of SLPs in different locations to support different machine instructions, distributed multimedia communication, and user interaction through a sequence of dynamically linked and cached service logic programs.

30. The system of claim 29 wherein said service logic programs are modeled from routing control parameters selected from the group consisting of time, space, preference, performance, security and combinations thereof.

31. The system of claim 29 wherein the system constructs a set of hierarchical addressable entities and associates said service logic programs with said entities.

32. The system of claim 29 wherein said service logic programs are associated with machine instructions.

33. The system of claim 32 wherein said machine instructions are developed through interaction with a user through a computer user interface.

34. The system of claim 32 wherein the system modifies at least one of said machine instructions and propagates the modified machine instructions to distributed locations across a network.

35. The system of claim 10 wherein the system models a unified method of Web contact center operation by using a call transfer model where the unified context of interaction between said service logic programs of said addressable entities modeled in a call object in real-time supports dynamic modification of said service logic programs and modified rules are propagated to listening agents through dynamic updates of said service logic programs that are cached in said WHD.

* * * * *